United States Patent
Jefferies (10) Patent No.: US 11,014,194 B2
(45) Date of Patent: May 25, 2021

(54) LASER MATERIAL PROCESSING DISTANCE GAUGE

(71) Applicant: Coherent, Inc., Santa Clara, CA (US)

(72) Inventor: Keith Jefferies, New Hudson, MI (US)

(73) Assignee: Coherent, Inc., Santa Clara, CA (US)

( * ) Notice: Subject to any disclaimer, the term of this patent is extended or adjusted under 35 U.S.C. 154(b) by 688 days.

(21) Appl. No.: 15/801,674

(22) Filed: Nov. 2, 2017

(65) Prior Publication Data

US 2019/0126392 A1  May 2, 2019

(51) Int. Cl.
*B23K 26/04* (2014.01)
*G01B 7/14* (2006.01)
*B23K 26/38* (2014.01)

(52) U.S. Cl.
CPC ............ *B23K 26/048* (2013.01); *B23K 26/38* (2013.01); *G01B 7/14* (2013.01)

(58) Field of Classification Search
None
See application file for complete search history.

(56) References Cited

U.S. PATENT DOCUMENTS

| | | | |
|---|---|---|---|
| 3,761,805 A | 9/1973 | Dornberger | |
| 4,167,697 A * | 9/1979 | Gerber | G01R 27/2605 324/661 |
| 5,111,065 A * | 5/1992 | Roberge | G05F 1/462 327/109 |
| 5,585,733 A | 12/1996 | Paglione | |
| 6,150,826 A * | 11/2000 | Hokodate | B23K 26/04 324/662 |
| 6,181,142 B1 | 1/2001 | Mallory | |
| 8,405,409 B2 | 3/2013 | Hermann et al. | |
| 9,128,136 B2 * | 9/2015 | Wurzinger | G01R 27/2605 |
| 2004/0075442 A1 * | 4/2004 | Iannello | G01D 5/24 324/632 |

FOREIGN PATENT DOCUMENTS

DE  19906442 A1  9/2000

OTHER PUBLICATIONS

"AN-1515 A Comprehensive Study of the Howland Current Pump", Texas Instruments, Application Report, SNOA474A, 2013, 17 pages.
"Capacitive Sensing", Available at: https://github.com/ytai/ioio/wiki/Capacitive-Sensing, 2013, 3 pages.
(Continued)

*Primary Examiner* — Ibrahime A Abraham
*Assistant Examiner* — Elizabeth M Sims
(74) *Attorney, Agent, or Firm* — Morrison & Foerster LLP (57) ABSTRACT

Apparatus for distance gauging in laser material processing includes a source of laser-radiation, an electrically-conductive focusing assembly, a constant-current source, and a voltmeter. The focusing assembly focuses laser-radiation towards an electrically conductive workpiece being processed. The focusing assembly and the workpiece form a capacitive sensor. The constant current source provides a constant electrical current to the focusing assembly for a constant time. The focusing assembly and the workpiece are separated by a distance that is proportional to a change in voltage measured on the focusing assembly during the constant time.

16 Claims, 7 Drawing Sheets

(56) References Cited

OTHER PUBLICATIONS

"Understanding Capacitive Position Sensors", MicroSense, 2011, 12 pages.
Madaan et al., "Capacitive Sensing Made Easy, Part 1: An Introduction to Different Capacitive Sensing Technologies", Cypress Perform, Apr. 2012, 8 pages.
Nadal-Guardia et al., "Constant Charge Operation of Capacitor Sensors Based on Switched-Current Circuits", IEEE Sensors Journal, vol. 3, No. 6, Dec. 2003, pp. 835-842.
International Search Report and Written Opinion received for PCT Patent Application No. PCT/US2018/055222, dated Jan. 30, 2019, 12 pages.

* cited by examiner

LASER MATERIAL PROCESSING DISTANCE GAUGE

TECHNICAL FIELD OF THE INVENTION

The present invention relates in general to capacitive distance gauging. The invention relates in particular to capacitive distance gauging in precision laser material processing.

DISCUSSION OF BACKGROUND ART

Beams of laser-radiation are increasingly used for cutting, drilling, marking, and scribing workpieces made of a wide range of materials; including metals and alloys, brittle materials such as glass and sapphire, and pliable materials such as polymers and plastics. Traditional mechanical processing produces unwanted defects, such as micro-cracks that may propagate when a processed workpiece is stressed, thereby degrading and weakening the processed workpiece. Laser-processing minimizes such unwanted defects, is generally cleaner, and causes a smaller heat-affected zone. Laser-machining uses a focused laser-beam to produce precise cuts and holes, having high-quality edges and walls, while minimizing the formation of unwanted defects. In laser welding a focused laser-beam locates each weld spot or seam precisely and produces minimal collateral heating. In laser-marking, controlled exposure to a focused laser-beam produces a visually-distinguishable material modification in a well-defined area or volume of the workpiece. All these applications demand improved laser-processing speed and improved location of the focused laser-beam.

Desired features are formed in a workpiece by moving the focused beam in three dimensions through the workpiece. For smaller workpieces, linear-translation stages support the workpiece and move the workpiece in three dimensions through the focused beam up to a maximum controlled scan speed. Higher lateral scan speeds are accessible using galvanometer-actuated motors to deflect the unfocused beam, thereby translating the focused beam laterally through the workpiece. State-of-the-art laser-processing workstations use computer numerical control and provide additional degrees of freedom for workpieces having complex shapes. In "flying optics" workstations, the beam of laser-radiation is delivered to a focusing element that moves with respect to a stationary workpiece during processing. For larger workpieces, the focusing element may be attached to an articulated robot arm.

The focusing element is typically one component of a "processing head" or "nozzle assembly". The processing head may also inject processing gases into the focused beam, which may be active gases (such as oxygen) that directly assist the laser-processing or inert gases (such as nitrogen or argon). The processing head may further include imaging hardware such as a camera and lenses, as well as a visible aiming beam to aid set up. Processing heads are commercially available having a variety of such options, for example from Rofin-LASAG AG. of Belp, Switzerland.

Precision laser-processing requires accurate real-time measurement of the distance between the processing head and the workpiece. A favored method is to treat the processing head and the workpiece as two conductors of a capacitance sensor. The capacitance is proportional to the surface areas of the conductors, the dielectric constant of any medium between them, and inversely proportional to the distance between them. When the capacitance sensor is charged, a change in distance will be proportional to the change in electric potential difference (hereafter referred to as "voltage") between the two conductors, which is easily measured.

It is more common to apply an oscillating voltage to the capacitance sensor, which becomes one component of a resistor-capacitor (RC) circuit, with a change in distance measured through a change in the resonance frequency of the circuit. To improve sensitivity to small changes in capacitance, the RC circuit may be operated on a spectral edge of a bandpass filter. In one implementation, transmitting output from the oscillating RC circuit through a bandpass filter converts small capacitance and frequency changes into proportionally much larger amplitude changes. An example of this implementation is described in U.S. Pat. No. 8,405,409, which also includes a discussion of noise and response time considerations for such measurements.

A limitation of capacitance sensors having a RC circuit is that the circuit must be customized for a specific processing head and is optimized for operation over a small range of measured capacitances. Generally, the capacitance sensor becomes impotent when the processing head is exchanged or even when just the nozzle part is exchanged. Further, noise in a capacitance measurement using an RC circuit imposes a minimum time for obtaining a distance measurement of sufficient precision, thereby reducing the temporal resolution for real-time distance measurement. This includes environmental electrical noise and noise generated by laser-processing. Prior-art circuit designs intended to overcome these deficiencies generally require compromises in dynamic range and complexity.

There is need for a precise non-contact distance-measurement apparatus capable of accommodating a broad range of processing heads and nozzles for laser-processing. The apparatus should be capable of rapid distance measurement for real-time control of a laser-process. Preferably, the apparatus would be tolerant of noise, provide a broad dynamic range, and have a relatively-simple robust design.

SUMMARY OF THE INVENTION

In one aspect, laser apparatus for processing an electrically-conductive workpiece in accordance with the present invention comprises a laser source delivering a beam of laser-radiation and a focusing assembly having a housing made of an electrically-conductive material. The focusing assembly is located and arranged to receive the beam of laser-radiation. The focusing assembly is configured to focus the beam of laser-radiation and direct the focused beam of laser-radiation towards the workpiece. The focused beam of laser-radiation emerges through a port on a bottom surface of the conductive housing. A first constant-current source is provided and arranged to deliver a first constant current to the conductive housing for a selected constant-time duration. A voltmeter is provided and arranged to measure voltage between the conductive housing and a reference node. The bottom surface of the conductive housing and a top surface of the workpiece are separated by a gap distance. A change in measured voltage over the constant-time duration is used to determine the gap distance.

In another aspect of the present invention, laser apparatus for processing an electrically-insulating workpiece comprises an electrically-conductive translation stage having a top surface that is arranged to mechanically support the workpiece, a laser source delivering a beam of laser-radiation, and a focusing assembly having a housing made of an electrically-conductive material. The focusing assembly is located and arranged to receive the beam of laser-radiation.

The focusing assembly is configured to focus the beam of laser-radiation and direct the focused beam of laser-radiation towards the workpiece. The focused beam of laser-radiation emerges through a port on a bottom surface of the conductive housing. A first constant-current source is provided and arranged to deliver a first constant current to the conductive housing for a selected constant-time duration. A voltmeter is provided and arranged to measure voltage between the conductive housing and a reference node. The bottom surface of the conductive housing and the top surface of the translation stage are separated by a gap distance. A change in measured voltage over the constant-time duration is used to determine the gap distance.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
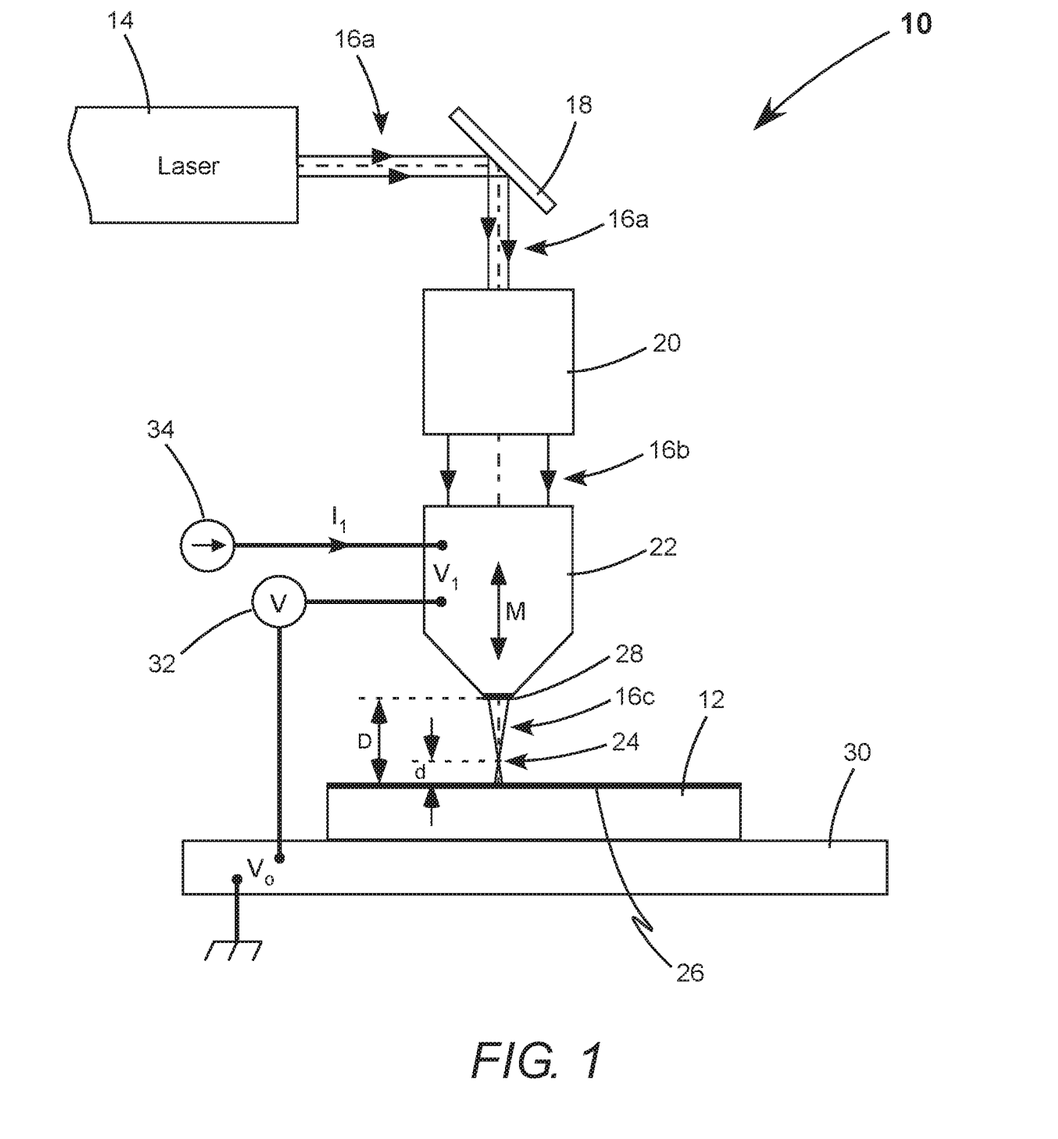
FIG. 1 schematically illustrates one preferred embodiment of laser apparatus in accordance with the present invention for laser-processing an electrically-conductive workpiece, including a laser-source generating a beam of laser-radiation, a focusing assembly that focuses the beam of laser-radiation, and a constant-current source that provides a constant current that electrically charges the focusing assembly.

Referring now to the drawings, wherein like components are designated by like numerals, FIG. 1 schematically illustrates one preferred embodiment 10 of laser-apparatus in accordance with the present invention for laser-processing a workpiece 12. Apparatus 10 comprises a laser-source 14 generating a beam of laser-radiation 16a. Properties of beam of laser-radiation 16a (such as wavelength, pulse duration, and average power) are selected to optimize the laser-processing of workpiece 12. Beam of laser-radiation 16a is depicted by a broken line representing an optical axis, a pair of solid lines representing peripheral rays, and arrows indicating a propagation direction.

An optional turning mirror 18 is arranged to intercept and direct beam of laser-radiation 16a. An optional beam expander 20 is arranged to intercept directed beam of laser-radiation 16a and to form an expanded beam of laser-radiation 16b having a larger beam diameter. A focusing assembly 22 is arranged to intercept expanded beam of laser-radiation 16b and to form a focused beam of laser-radiation 16c having a focus 24, which is located a distance d from a top surface 26 of workpiece 12. Focusing assembly 22 includes a lens that focuses the beam of laser-radiation. This lens is selected to optimize laser-processing of the workpiece, but could range from a simple single-element lens through to a complex multi-element objective. For example, a "F-Theta objective" that locates focus 24 in a flat focal plane located a fixed distance from the lens.

Focusing assembly 22 includes an external housing made of an electrically-conductive material that partially or completely encloses the lens. Focused beam of laser-radiation 16c emerges through a port on a bottom surface 28 of the electrically-conductive housing, which would be the bottom surface of a nozzle in a processing head that delivers processing gases. Terms such as "top" and "bottom" are used herein for convenience of description, but are not meant to limit spatial orientation of the laser-processing apparatus in use. Focusing assembly 22 may further include a nozzle and internal hardware for delivering processing gases to a volume located between the focusing assembly and the workpiece. Focusing assembly 22 may be a commercial processing head that includes other convenient features to facilitate laser-processing.

Workpiece 12 is supported and spatially located by a translation stage 30, which is made of electrically-conductive materials and is electrically connected to ground. Herein, translation stage means any electrically-conductive structure that supports the workpiece. Workpiece 12 is also made of an electrically-conductive material and is electrically connected to translation stage 30. Focusing assembly 22 is electrically isolated from the workpiece and from the translation stage.

Bottom surface 28 of focusing assembly 22 and top surface 26 of workpiece 12 are separated by a "gap distance" D. Motion of focusing assembly 22 with-respect-to workpiece 12 along the optical axis of focused beam of laser-radiation 16c is indicated by vector M and changes gap distance D. Motion along this axis can be achieved by moving focusing assembly 22 or by moving translation stage 30 and workpiece 12 thereon. Lateral motion is achieved by moving translation stage 30 and workpiece 12 thereon.

Since the distance between bottom surface 28 and focus 24 is fixed or otherwise known, distance d between focus 24 and top surface 26 is determined by measuring gap distance D. It should be noted that distance d could be negative while laser-processing is removing material from workpiece 12. A capacitive sensor is formed between top surface 26 and bottom surface 28. In most applications, top surface 26 has a much larger area than bottom surface 28. In these applications, to a good approximation, a "gap capacitance" $C_G$ across gap distance D depends on only the area A of the bottom surface for a particular focusing assembly. Both air and commonly used processing gases have dielectric constants k that are within a range of 1.00 to 1.01. Using the equation for capacitance of a parallel plate capacitor, once the gap sensor is calibrated for a particular focusing assembly, gap capacitance $C_G$ depends only on gap distance D:

$$C_G \approx \frac{k \cdot \varepsilon_0 \cdot A}{D} \approx \frac{\varepsilon_0 \cdot A}{D} \propto \frac{1}{D}. \quad (1)$$

Workpiece 12, including top surface 26, is at a ground potential $V_o$. The conductive housing of focusing assembly 22, including bottom surface 28, is at a potential $V_1$. A voltmeter 32 is electrically connected between the conductive housing and a reference node. Here, the reference node is the workpiece, thereby voltmeter 32 measures a "gap voltage" $V_1$-$V_o$ between the conductive housing and the workpiece. A constant-current source 34 is electrically connected to focusing assembly 22 and provides a constant current $I_1$. Over a time duration, constant-current source 34 causes charge to linearly accumulate on the conductive housing of focusing assembly 22. A constant charge $Q_o$ will accumulate whenever constant-current source 34 is operated for a selected constant-time duration $T_o$, independent of the gap distance D.

Distance gauging to determine gap distance D is accomplished by measuring the change in gap voltage ΔV caused by constant charge $Q_o$ accumulating on the capacitive sensor having "gap capacitance" $C_G$:

$$Q_o = I_1 \cdot T_o = \Delta V \cdot C_G. \quad (2)$$

Combining equations (1) and (2), the gap distance D is proportional to the change in gap voltage ΔV over constant-time $T_o$ that constant current source 34 is operated:

$$D \propto \frac{1}{C_G} = \frac{\Delta V}{Q_o} \propto \Delta V. \quad (3)$$

In a simplest implementation, the capacitive sensor would be calibrated by measuring the change in gap voltage ΔV when set to a known gap distance D.

Figure 2:
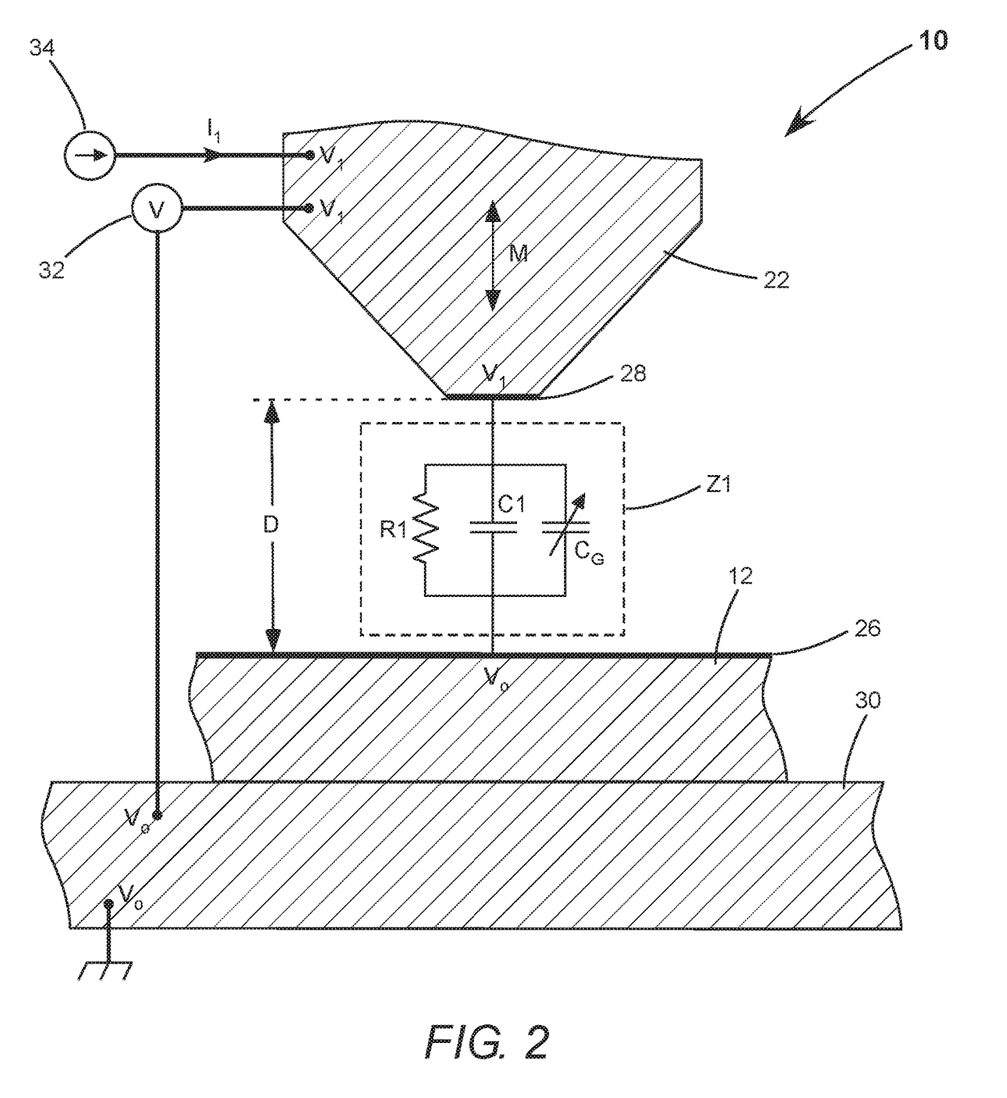
FIG. 2 schematically illustrates additional details of the laser-processing apparatus of FIG. 1, including electrical characteristics of a capacitive sensor formed between a top surface of the workpiece and a bottom surface of the focusing assembly.

FIG. 2 schematically illustrates additional details of laser-processing apparatus 10 in accordance with the present invention. Workpiece 12, focusing assembly 22, and translation stage 30 are shaded to indicate they are electrically-conductive. Focused beam of laser-radiation 16c is omitted from the drawing for clarity of illustration. R1 represents an electrical resistance between top surface 26 and bottom surface 28. In general, air and processing gases are not perfect electrical insulators, particularly when laser-processing causes ionization of these gases. Material ejected from workpiece 12 during processing may also cause some charge leakage across the gap. Other indirect pathways for charge leakage between workpiece 12 and focusing assembly 22 can be minimized by careful design such that electrical resistance R1 becomes negligible.

In contrast, background capacitance or "stray capacitance" C1 of the conductive housing of focusing assembly 22 and workpiece 12 can be significant enough to limit the resolution of the capacitive sensor. All electrically-conductive parts and electrical cables located close to top surface 26 and bottom surface 28 contribute to background capacitance C1, which is independent of gap distance D. In a typical laser-processing apparatus, C1 could range from 10 pF (pico-farads) to 1000 pF, depending particularly on the design of the processing head. Together, $C_G$, R1, and C1 are the total electrical impedance Z1 of the capacitive sensor. Individually, they are not real electronic components, but rather represent electrical characteristics of the capacitive sensor.

Figure 3:
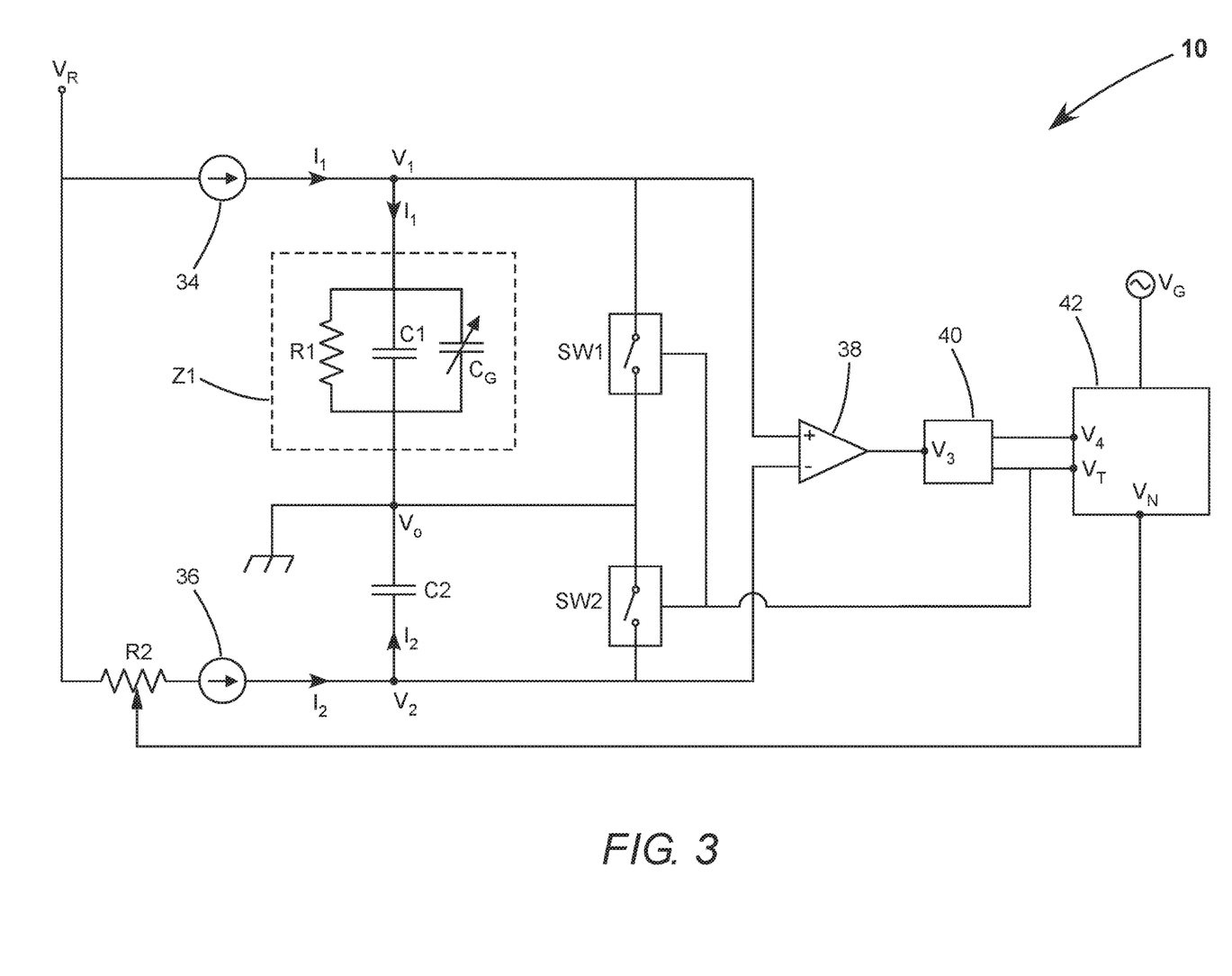
FIG. 3 is a circuit diagram schematically illustrating electrical elements within the laser-processing apparatus of FIGS. 1 and 2, including the capacitive sensor and a null capacitor that is electrically charged by another constant-current source.

FIG. 3 is a circuit diagram schematically illustrating a preferred selection and arrangement of electrical elements within laser-processing apparatus 10. The circuit includes impedance Z1 of the capacitive sensor described above. Another constant-current source 36 is arranged to charge a "null capacitor" C2 by supplying a constant current $I_2$. A first terminal of null capacitor C2 is electrically connected to workpiece 12 and is at ground potential $V_o$. A second terminal of null capacitor C2 is electrically connected to constant-current source 36 and is at a potential $V_2$. Constant-current source 34 is connected directly to a reference potential $V_R$. Constant-current source 36 is connected to the reference potential $V_R$ through a potentiometer R2, which is preferably a digital potentiometer. The reference potential of constant-current source 36 may be set lower than $V_R$ by adjusting potentiometer R2, thereby adjusting constant current $I_2$.

An exemplary circuit for constant-current sources 34 and 36 is a Howland current pump, which is described in detail in *Texas Instruments Application Report SNOA474A, Revised April* 2013, *"A Comprehensive Study of the Howland Current Pump"*. Constant-current sources are well known the art of electronics design and further description thereof is not necessary for understanding the principles of the present invention.

Again, a voltmeter is electrically connected between the conductive housing and a reference node. Here, the reference node is the second terminal of null capacitor C2 and the voltmeter is a differential amplifier 38. Differential amplifier 38 produces an amplified voltage $V_3$ that is proportional to voltage $V_2$-$V_1$ across both the capacitive sensor and the null capacitor. Constant current $I_2$ is set to charge null capacitor C2 at the same rate that constant current $I_1$ charges background capacitance C1. Background capacitance C1 is thereby nulled, such that differential amplifier 38 effectively amplifies just that component of voltage $V_2$-$V_1$ produced by constant current $I_1$ charging gap capacitance $C_G$.

A switch SW1 connected across capacitive sensor Z1 enables the capacitive sensor to be discharged when necessary. Another switch SW2 connected across null capacitor C2 enables the null capacitor to be discharged when necessary. Switches SW1 and SW2 are preferably digitally-controlled switches.

A simple way to adjust constant current $I_2$ such that background capacitance C1 is properly nulled is to separate workpiece 12 and focusing assembly 22, setting a gap distance D that is much larger than any gap distance used during laser-processing. Equation (1) shows the gap capacitance $C_G$ becomes small, therefore the impedance of capacitive sensor Z1 becomes approximately background capacitance C1. Opening switches SW1 and SW2 initiates charging of capacitive sensor Z1 and null capacitor C2. When properly nulled, they charge at about the same rate, therefore potential $V_1$ will be about equal to potential $V_2$, while amplified voltage $V_3$ will be approximately 0 V. Potentiometer R2 is adjusted until this condition is achieved.

Differential amplifier 38 is connected to a sample-and-hold circuit 40, which receives amplified voltage $V_3$ and provides an output voltage $V_4$. Sample-and-hold circuit 40 is connected to a controller 42, which measures output voltage $V_4$. Controller 42 provides a control signal $V_T$ to sample-and-hold circuit 40 and a "nulling voltage" $V_N$ used to set potentiometer R2. Controller 42 also provides an output "gap signal" $V_G$ that is proportional to the gap distance D.

Controller 42 could be a customized electrical circuit having a plurality of electrical components, a multi-purpose micro-controller integrated circuit (IC), or a field programmable gate array (FPGA) device. Differential amplifier 38 and sample-and-hold circuit 40 could be integrated into controller 42. From the circuit diagram and the description provided above, those skilled in the art would recognize alternative ways to implement these measurement and control functions of the circuit, without departing from the spirit and scope of the present invention. In a basic implementation, gap signal $V_G$ could be output voltage $V_4$ measured through an analogue-to-digital converter channel. With some additional processing, gap signal $V_G$ could be a digital signal that is a calibrated gap distance D in units of micrometers.

FIGS. 4A-4F form a timing diagram schematically illustrating an exemplary scheme to determine a gap signal $V_G$ using the capacitive sensor of FIGS. 1-3. The example assumes the capacitive sensor has been calibrated and nulled, as described above. In this example, measurement and control are synchronous with motion of focusing assembly 22 with respect to workpiece 12. Also, motion and measurement occur at a relatively high duty cycle for illustrative purposes.

Figure 4A:
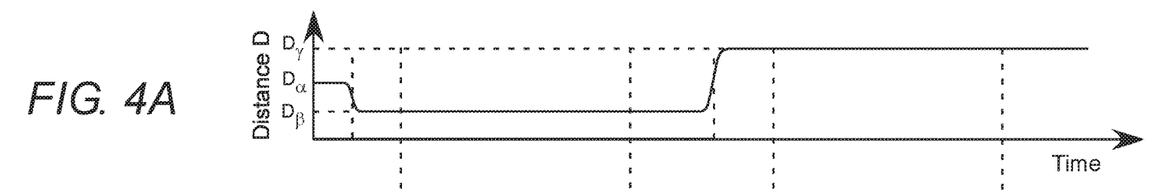
FIGS. 4A, 4B, 4C, 4D, 4E, and 4F form a timing diagram schematically illustrating a scheme to determine a gap signal that is proportional to a gap distance in the laser-processing apparatus of FIGS. 1 and 2.
Figure 4B:
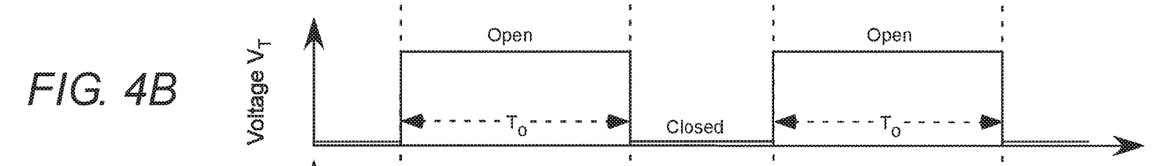
Figure 4C:
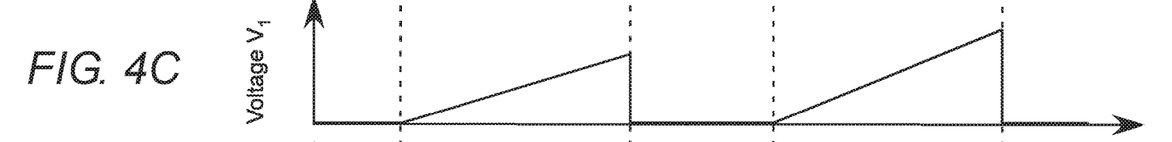
Figure 4D:
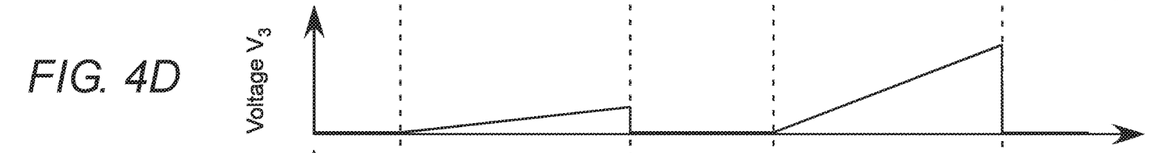
Figure 4E:
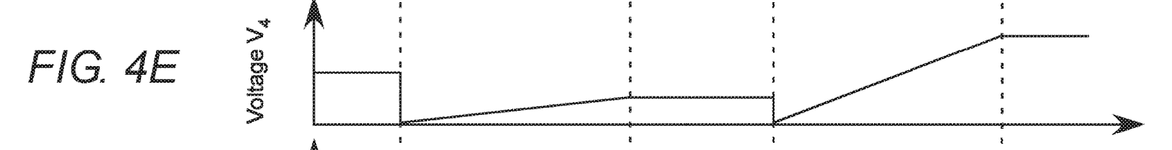
Figure 4F:
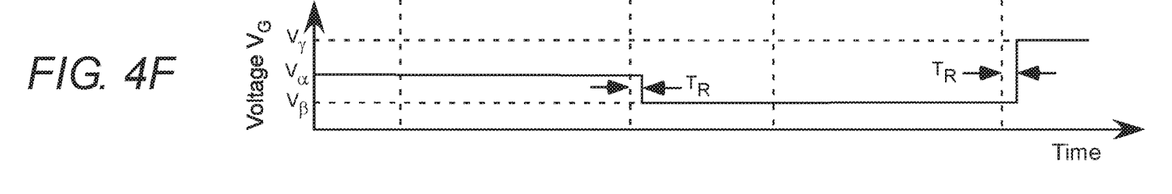

FIG. 4A depicts gap distance D as a function of time. Here, focusing assembly 22 is moved such that gap distance D steps between three values $D_\alpha$, $D_\beta$, and $D_\gamma$. FIG. 4B depicts control signal $V_T$ as a function of time. Here, switches SW1 and SW2 are open when $V_T$ is high and are closed when $V_T$ is low. SW1 and SW2 open to allow charging of the capacitive sensor and null capacitor for a constant-time duration $T_o$. FIG. 4C depicts potential $V_1$ as a function of time. FIG. 4D depicts amplified voltage $V_3$ from differential amplifier 38 as a function of time. FIG. 4E depicts output voltage $V_4$ from sample-and-hold circuit 40 as a function of time. Control signal $V_T$ going high triggers continuous sampling and $V_T$ going low triggers holding. FIG. 4F depicts gap signal $V_G$ as a function of time. After control signal $V_T$ goes low and after a response time $T_R$, gap signal $V_G$ is changes to a new value determined from output voltage $V_4$.

For high-bandwidth distance gauging, meaning capability to measure distance frequently, a short constant-time duration $T_o$ is preferable. Equation (2) shows that a short constant-time duration $T_o$ requires a high constant current $I_1$. However, higher charging currents induce larger magnetic fields, which in turn induces electrical noise. Therefore, there is some compromise between gauging bandwidth and measurement noise. Constant-time duration $T_o$ is preferably in a range of about 1 μs (microseconds) to about 1000 μs and is most preferably about 20 μs. Constant current $I_1$ is preferably in a range of about 1 μA (micro-ampere) to about 100 μA and is most preferably about 10 μA. Response time $T_R$ is limited by the speed of controller 42, which is preferably less than about 5 μs and is most preferably less than about 1 μs.

Figure 5A:
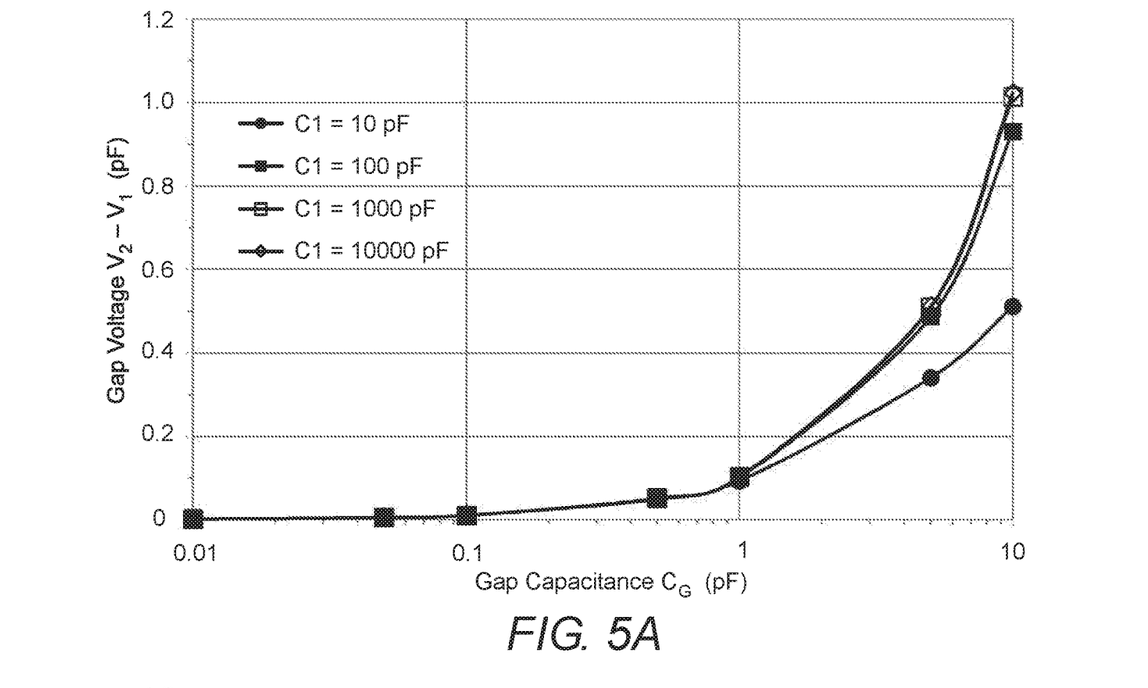
FIG. 5A is a graph schematically illustrating gap voltage as a function of gap capacitance in the laser-processing apparatus of FIGS. 1 and 2, including the electrical elements of FIG. 3, for different values of background capacitance.

FIG. 5A is a graph schematically illustrating calculated voltage $V_2$-$V_1$ as a function of gap capacitance $C_G$ for different values of background capacitance C1 in one example of laser-processing apparatus 10. In the example depicted, bottom surface 28 of focusing assembly 22 has an annular shape, with an inside diameter of 0.9 mm (millimeters) and an outside diameter of 1.5 mm. Gap capacitances $C_G$ in the depicted range 0.01 pF to 10 pF correspond to gap distances D in the range 1 mm to 0.001 mm.

An advantage of nulling background capacitance C1 is that for smaller gap capacitances $C_G$, which correspond to larger gap distances D, voltage $V_2$-$V_1$ may be adjusted to a common value over a broad range of background capacitances C1. Here, the common value is conveniently selected to be about 0 V (volts). In laser-processing applications, a large change in C1 would occur when there is a change in processing head, for example. Although a C1 value of 10000 pF is unrealistically high, FIG. 5A illustrates that such a large background capacitance could be handled by the inventive circuit.

Figure 5B:
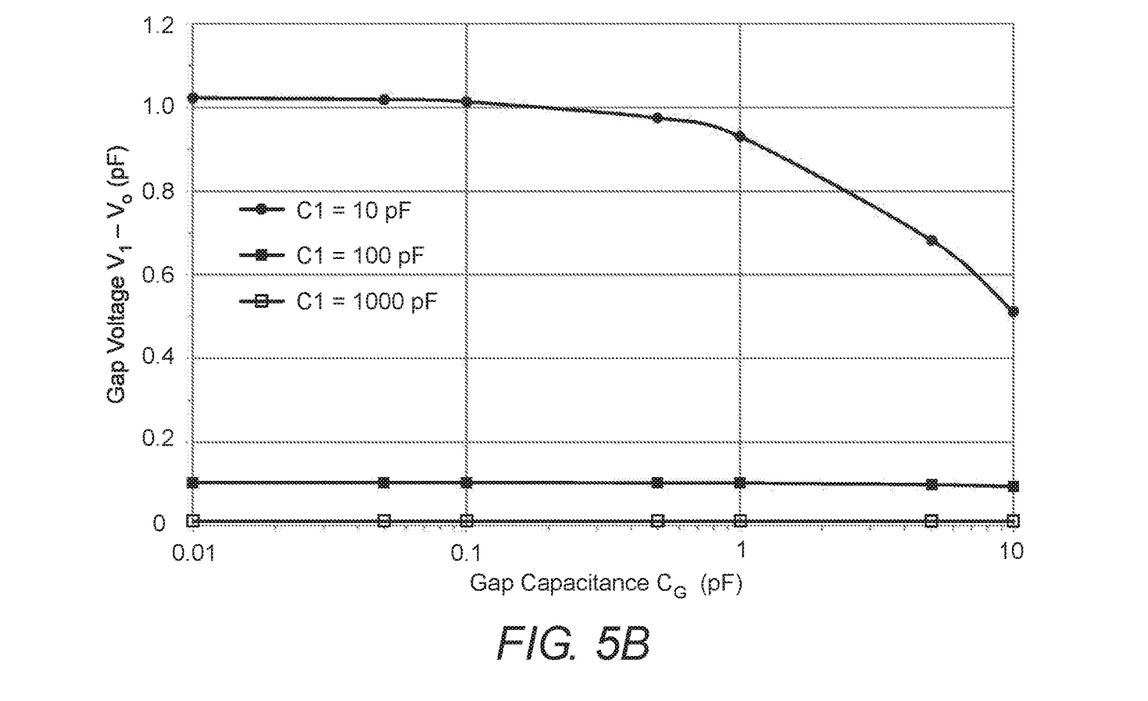
FIG. 5B is a graph schematically illustrating gap voltage as a function of gap capacitance in the laser-processing apparatus of FIGS. 1 and 2, without including the null capacitor of FIG. 3, for different values of background capacitance.

FIG. 5B is a graph schematically illustrating calculated gap voltage $V_1$-$V_o$ as a function of gap capacitance $C_G$ using the same laser-processing apparatus as FIG. 5A, with an exception that the circuit of FIG. 3 is not used to null background capacitance C1. Instead, gap voltage $V_1$-$V_o$ is simply measured using voltmeter 32 depicted in FIG. 1. Large background capacitances C1 overwhelm gap capacitance $C_G$, such that large changes in gap distance D produce relatively small changes in gap voltage $V_1$-$V_o$. The resolution of the capacitive sensor is correspondingly limited. FIGS. 5A and 5B together illustrate that an advantage of including nulling background capacitance C1 is a larger dynamic range in distance gauging while accommodating a broader range of background capacitances C1.

Figure 5C:
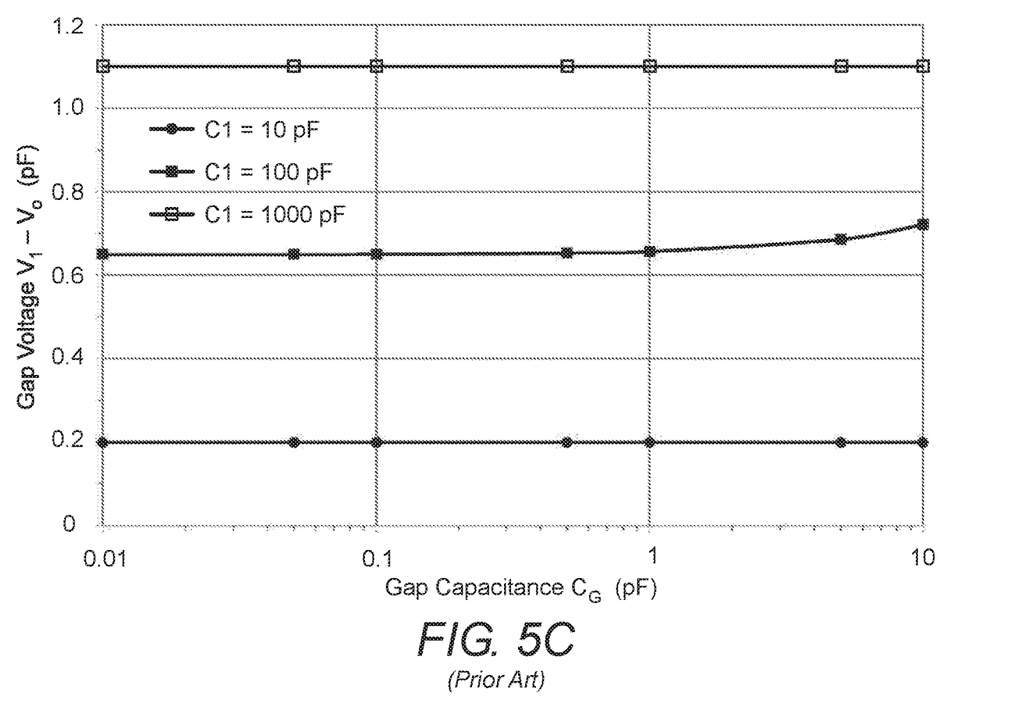
FIG. 5C is a graph schematically illustrating gap voltage as a function of gap capacitance in a prior-art laser-processing apparatus, for different values of background capacitance.

FIG. 5C is a graph schematically illustrating a calculated gap voltage that is equivalent to $V_1$-$V_o$ as a function of gap capacitance $C_G$. The calculation models an equivalent prior-art capacitance sensor having a RC circuit and bandpass filter trimmed to accommodate a background capacitance C1 of 100 pF. The shape and dimensions of the bottom surface of the processing head are the same as for FIGS. 5A and 5B. The RC circuit is trimmed to oscillate at less than 2 MHz (mega-hertz) over the depicted range of gap capacitance. In the model, radio frequency (RF) output from the RC circuit is filtered through a $7^{th}$-order 650 kHz (kilo-hertz) linear-phase low-pass filter. Amplitude of the filtered RF output is measured by a RF power detector. Compared to the inventive capacitive sensor of FIG. 5A, the prior-art capacitance sensor has a much smaller dynamic range, even at the target background capacitance C1 of 100 pF. In this example, the prior-art capacitance sensor is useable only over a small distance range of about 0.001 mm to 0.1 mm and only around the target background capacitance of 100 pF.

Figure 6:
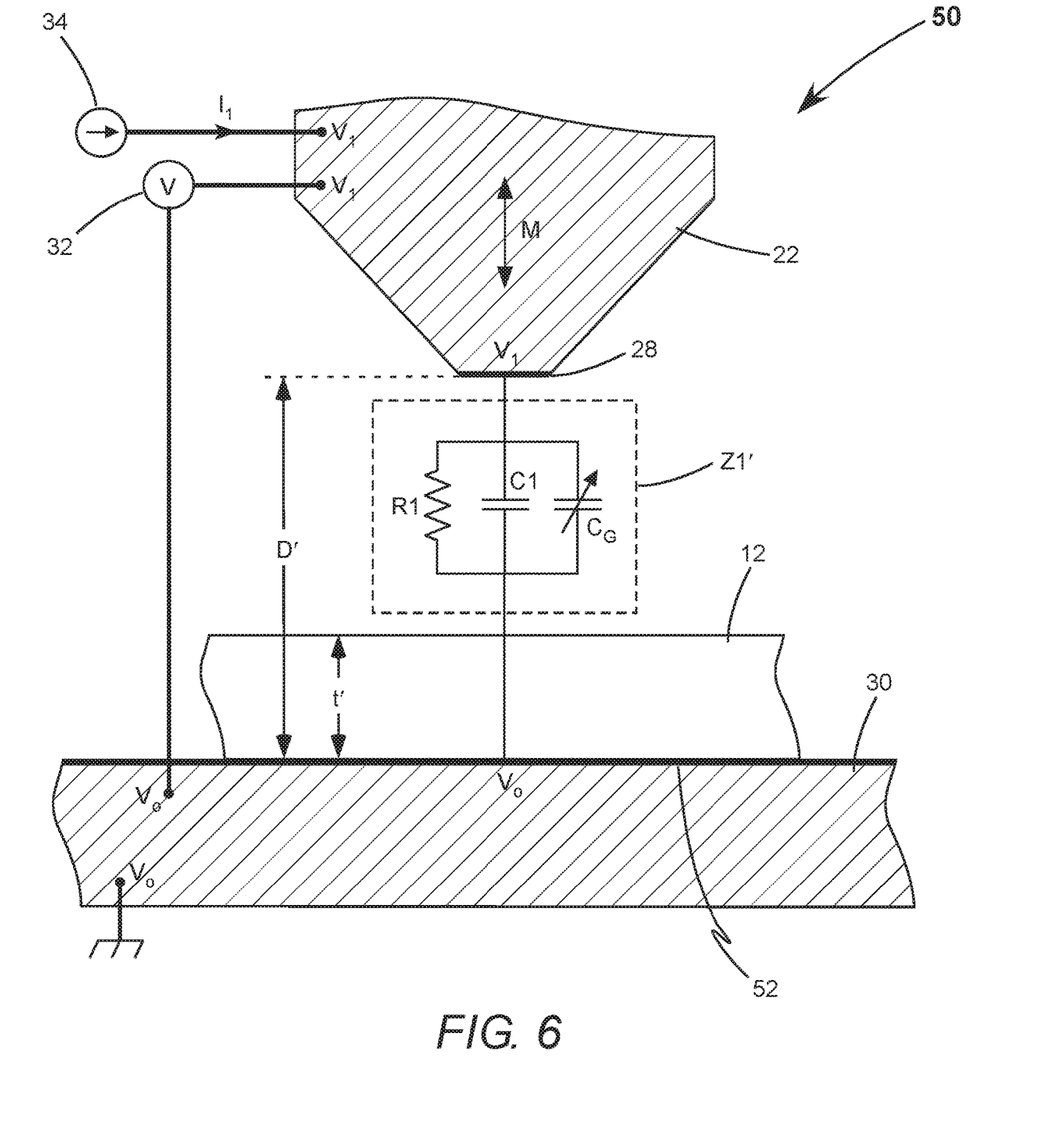
FIG. 6 schematically illustrates detail of another preferred embodiment of laser apparatus in accordance with the present invention, similar to the embodiment of FIGS. 1 and 2, but for laser-processing an electrically-insulating workpiece.

FIG. 6 schematically illustrates details of another embodiment of laser-processing apparatus 50 in accordance with the present invention. Apparatus 50 is similar to apparatus 10 of FIGS. 1 and 2, with an exception that workpiece 12 is made of an electrically-insulating material having a dielectric constant k'. A capacitive sensor is formed between a top surface 52 of translation stage 30 and bottom surface 28 of focusing assembly 22. A gap distance D' between top surface 52 and bottom surface 28 is again determined by measuring a change in gap voltage ΔV when applying a constant current $I_1$ for a constant-time duration $T_o$ in the manner described above. However, dielectric constant k' and thickness t' of workpiece 12 must be taken into account when calculating gap distance D'. Gap distance D' in turn determines gap distance d between focus 24 and top surface 26 of workpiece 12, depicted in FIG. 1. The preferred circuit of FIG. 3 and the exemplary measurement and control scheme of FIG. 4 provide the same advantages for laser-processing apparatus 50.

Returning to FIG. 3, a constant-current source such as a Howland current pump has an advantage in minimizing measurement noise during capacitive distance gauging. Stray currents may be induced on electrical cables connected to the focusing assembly and the translation stage, which includes electrical cables of the capacitive sensor, or any electrically conductive parts that are in contact with the capacitive sensor. Stray currents are a major source of electrical noise and measurement uncertainty in prior-art capacitance sensors. Assuming constant-current sources 34 and 36 in the preferred circuit have sufficient dynamic impedance, any stray currents induced in elements at potentials $V_1$ or $V_2$ will be automatically compensated by the constant-current sources providing commensurately more or less current.

The circuit of FIG. 3 depicts constant-current sources 34 and 36 as two discrete components; for example, two Howland current pumps. Those skilled in the art of electrical design would recognize that two constant-current sources could be realized by using just one Howland current pump and a current divider, without departing from the spirit and scope of the present invention. A potentiometer connected across null capacitor C2 would provide adjustment for constant current $I_2$ relative to constant current $I_1$ and thereby enable nulling of background capacitance C1 in the manner described above.

Once the inventive laser-processing apparatus has been nulled and calibrated, laser-processing can be controlled in a closed-loop manner, whereby controller 42 or a higher-level controller sets the laser-processing apparatus to a required distance D, D', or d using the gap signal as feedback. Using closed-loop control, the laser-processing apparatus may be maintained at a constant optimum distance in welding applications or may be programmed to follow a predetermined distance profile to machine a workpiece into a desired form. The laser-processing apparatus can be re-nulled and re-calibrated as necessary during an automated process. For example, as a first step in processing each new workpiece. General principles of closed-loop control are well-known in the arts of electronics and laser material processing. Further description thereof is not necessary for understanding the principles of the present invention.

The present invention is described above in terms of a preferred embodiment and other embodiments. The invention is not limited, however, to the embodiments described and depicted herein. Rather, the invention is limited only by the claims appended hereto.

What is claimed is:

1. Laser apparatus for processing an electrically-conductive workpiece, the apparatus comprising:
    a laser source delivering a beam of laser-radiation;
    a focusing assembly having a housing made of an electrically-conductive material, the focusing assembly located and arranged to receive the beam of laser-radiation, the focusing assembly configured to focus the beam of laser-radiation and direct the focused beam of laser-radiation towards the workpiece, the focused beam of laser-radiation emerging through a port on a bottom surface of the conductive housing;
    a first constant-current source arranged to deliver a first constant current to the conductive housing, causing charge to linearly accumulate on the conductive housing and thereby for a constant charge to accumulate over a selected constant-time duration; and
    a voltmeter arranged to measure voltage between the conductive housing and a reference node;
    wherein the bottom surface of the conductive housing and a top surface of the workpiece are separated by a gap distance, the constant charge accumulated on the conductive housing being independent of the gap distance, the gap distance being proportional to a change in measured voltage over the constant-time duration, and the change in measured voltage over the constant-time duration being used to determine the gap distance.

2. The laser apparatus of claim 1, wherein a distance between a focus of the beam of laser-radiation and the workpiece is determined from the gap distance.

3. The laser apparatus of claim 1, wherein the constant current source is a Howland current pump.

4. The laser apparatus of claim 1, wherein the reference node is the workpiece, the voltmeter measuring voltage between the conductive housing and the workpiece.

5. The laser apparatus of claim 1, further including a second constant-current source and a null capacitor, a first terminal of the null capacitor electrically connected to the workpiece, the second constant-current source delivering a second constant current to a second terminal of the null capacitor, the conductive housing and the workpiece having a background capacitance that is independent of the gap distance, the second constant current being set to cause charge to accumulate on the null capacitor at the same rate that the first constant current causes charge to accumulate on the conductive housing.

6. The laser apparatus of claim 5, wherein the reference node is the second terminal of the null capacitor, the voltmeter measuring voltage between the conductive housing and the second terminal of the null capacitor.

7. The laser apparatus of claim 1, wherein the constant-time duration is in a range of about 1 microsecond to about 1000 microseconds.

8. The laser apparatus of claim 1, wherein the first constant current is in a range of about 1 micro-ampere to about 100 micro-amperes.

9. The laser apparatus of claim 1, further including a controller, wherein processing is controlled in a closed-loop manner by the controller using a gap signal determined from the change in measured voltage to maintain an optimum distance.

10. The laser apparatus of claim 1, further including a controller, wherein processing is controlled in a closed-loop manner by the controller using a gap signal determined from the change in measured voltage to follow a predetermined distance profile.

11. Laser apparatus for processing an electrically-insulating workpiece, the apparatus comprising:
    an electrically-conductive translation stage having a top surface that is arranged to mechanically support the workpiece;
    a laser source delivering a beam of laser-radiation;
    a focusing assembly having a housing made of an electrically-conductive material, the focusing assembly located and arranged to receive the beam of laser-radiation, the focusing assembly configured to focus the beam of laser-radiation and direct the focused beam of laser-radiation towards the workpiece, the focused beam of laser-radiation emerging through a port on a bottom surface of the conductive housing;
    a first constant-current source arranged to deliver a first constant current to the conductive housing, causing charge to linearly accumulate on the conductive housing and thereby for a constant charge to accumulate over a selected constant-time duration; and
    a voltmeter arranged to measure voltage between the conductive housing and a reference node;
    wherein the bottom surface of the conductive housing and the top surface of the translation stage are separated by a gap distance, the constant charge accumulated on the conductive housing being independent of the gap distance, the gap distance being proportional to a change in measured voltage over the constant-time duration, and the change in measured voltage over the constant-time duration being used to determine the gap distance.

12. The laser apparatus of claim 11, wherein the reference node is the translation stage, the voltmeter measuring voltage between the conductive housing and the translation stage.

13. The laser apparatus of claim 11, further including a second constant-current source and a null capacitor, a first terminal of the null capacitor electrically connected to the translation stage, the second constant-current source delivering a second constant current to a second terminal of the null capacitor, the conductive housing and the translation stage having a background capacitance that is independent of the gap distance, the second constant current being set to cause charge to accumulate on the null capacitor at the same rate that the first constant current causes charge to accumulate on the conductive housing.

14. The laser apparatus of claim 13, wherein the reference node is the second terminal of the null capacitor, the voltmeter measuring voltage between the conductive housing and the second terminal of the null capacitor.

15. The laser apparatus of claim 11, further including a controller, wherein processing is controlled in a closed-loop manner by the controller using a gap signal determined from the change in measured voltage to maintain an optimum distance.

16. The laser apparatus of claim 11, further including a controller, wherein processing is controlled in a closed-loop manner by the controller using a gap signal determined from the change in measured voltage to follow a predetermined distance profile.

* * * * *